(12) United States Patent
Swann et al.

(10) Patent No.: US 6,431,595 B1
(45) Date of Patent: Aug. 13, 2002

(54) LONG DURATION AIR BAG INFLATOR

(75) Inventors: Timothy A. Swann, Mesa; Jess A. Cuevas, Scottsdale; Ahmad K. Al-Amin, Higley, all of AZ (US); Jack L. Blumenthal, Los Angeles, CA (US); Roy D. Van Wynsberghe; Bryan W. Shirk, both of Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/469,415

(22) Filed: Dec. 22, 1999

(51) Int. Cl.$^7$ ................................................ B60R 21/26
(52) U.S. Cl. ........................ 280/736; 280/737; 280/740; 280/741; 280/742
(58) Field of Search .............................. 280/741, 742, 280/736, 737, 740

(56) References Cited

U.S. PATENT DOCUMENTS

| | | | | |
|---|---|---|---|---|
| 5,725,243 A | * | 3/1998 | Skanberg | 280/741 X |
| 5,779,266 A | * | 7/1998 | Moore et al. | 280/741 X |
| 5,913,537 A | * | 6/1999 | Goetz | 280/741 |
| 5,938,235 A | * | 8/1999 | Butt | 280/736 |
| 5,964,479 A | * | 10/1999 | Rink et al. | 280/736 X |
| 6,120,058 A | * | 9/2000 | Mangum et al. | 280/741 |
| 6,149,191 A | * | 11/2000 | Rink | 280/736 |

FOREIGN PATENT DOCUMENTS

| | | |
|---|---|---|
| DE | 2111143 | 9/1971 |
| DE | 4135776 | 5/1993 |
| DE | 4303169 | 4/1994 |
| DE | 19939176 | 2/2001 |
| GB | 2314300 | 12/1997 |

OTHER PUBLICATIONS

U.S. application No. 08/946,152, filed Oct. 7, 1997, Co-pending entitled "Stage Pyrotechnic Air Bag Inflator".

* cited by examiner

Primary Examiner—Lanna Mai
Assistant Examiner—Toan To
(74) Attorney, Agent, or Firm—Tarolli, Sundheim, Covell, Tummino & Szabo L.L.P.

(57) ABSTRACT

An inflator (10) for inflating an inflatable vehicle occupant protection device (14) comprises a storage container (30), a primary inflation fluid under pressure in a gaseous state in the container, and a secondary inflation fluid under pressure in the container. The container (30) is openable to enable the primary inflation fluid to flow out of the container into the inflatable device to inflate the inflatable device (14). At least a portion of the secondary inflation fluid is in a non-gaseous state in the container (30) during flow of the primary inflation fluid into the inflatable device. The portion of the secondary inflation fluid in the non-gaseous state thereafter changing to the gaseous state and flowing into the inflatable device to maintain the inflatable device in the inflated condition.

12 Claims, 3 Drawing Sheets

LONG DURATION AIR BAG INFLATOR

BACKGROUND OF THE INVENTION

1. Technical Field

The present invention relates to a vehicle safety apparatus and, in particular, to an inflator for an inflatable vehicle occupant protection device, such as an air bag.

2. Description of the Prior Art

It is known to inflate a vehicle occupant protection device, such as an air bag, to help protect a vehicle occupant. The air bag is inflated by inflation fluid from an inflator. The air bag is inflated into a position between the vehicle occupant and a portion of the vehicle to help protect the vehicle occupant in the event of a vehicle collision or of a rollover condition of the vehicle.

One type of air bag, known as a side curtain, is inflated between the vehicle occupant and the side structure of the vehicle. It is desirable to maintain a side curtain inflated for a period of seven to ten seconds, in order to help protect the vehicle occupant in the event of a rollover condition of the vehicle.

SUMMARY OF THE INVENTION

The present invention is an inflator for inflating an inflatable vehicle occupant protection device. The inflator comprises a storage container, a primary inflation fluid under pressure in a gaseous state in the container, and a secondary inflation fluid under pressure in the container. The container is openable to enable the primary inflation fluid to flow out of the container into the inflatable device to inflate the inflatable device. At least a portion of the secondary inflation fluid is in a non-gaseous state in the container during flow of the primary inflation fluid into the inflatable device. The portion of the secondary inflation fluid in the non-gaseous state thereafter changes to the gaseous state and flows into the inflatable device to maintain the inflatable device in the inflated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
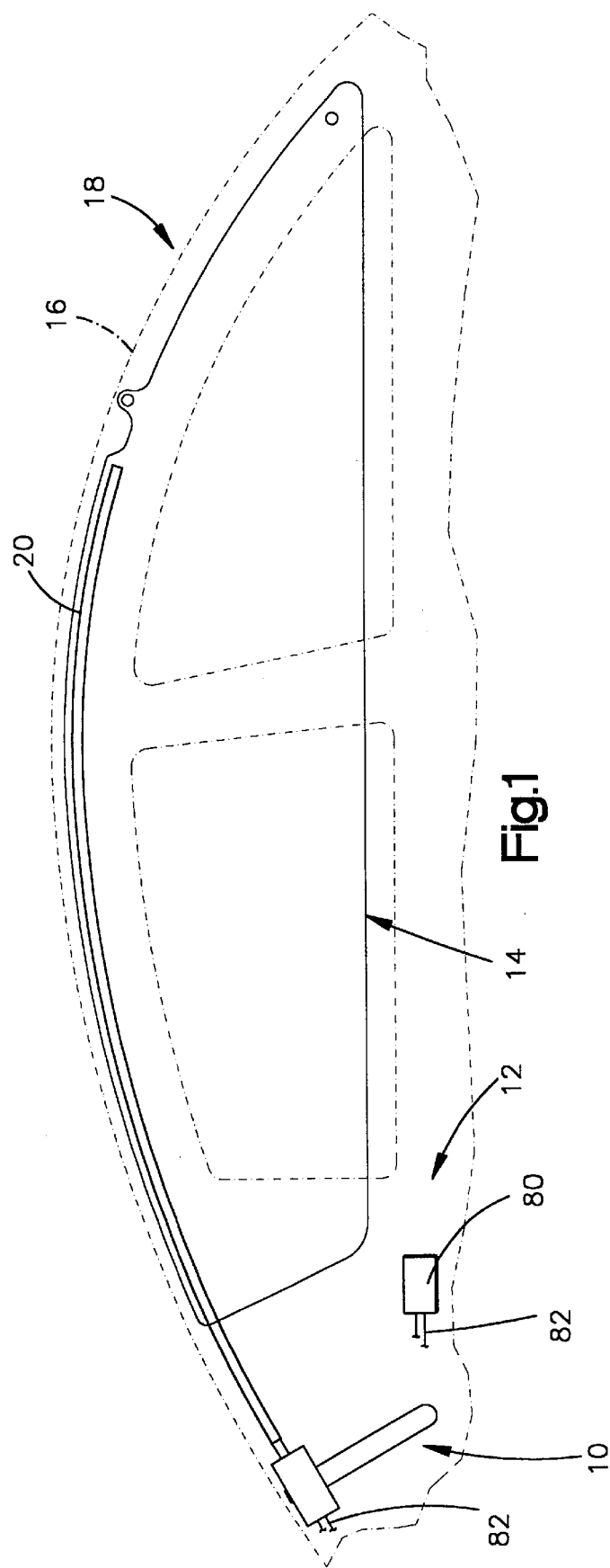
FIG. 1 is a schematic illustration of a vehicle safety apparatus including an inflator in accordance with the present invention.

The present invention relates to a vehicle safety apparatus and, in particular, to an inflator for an inflatable vehicle occupant protection device, such as an air bag. The present invention is applicable to various inflator constructions. As representative of the present invention, FIG. 1 illustrates an inflator 10 that forms a part of a vehicle safety apparatus 12.

The safety apparatus 12 includes an inflatable vehicle occupant protection device in the form of a side curtain 14. The side curtain 14 is mounted adjacent the side structure 16 of a vehicle 18, including side windows, together with a conduit or output tube indicated schematically at 20. The side curtain 14 is movable upon actuation of the inflator 10 from a deflated and stowed condition (not shown) to an inflated condition, as illustrated in FIG. 1, to help to protect occupants of the vehicle 18 in the event of a side impact to the vehicle.

Figure 2:
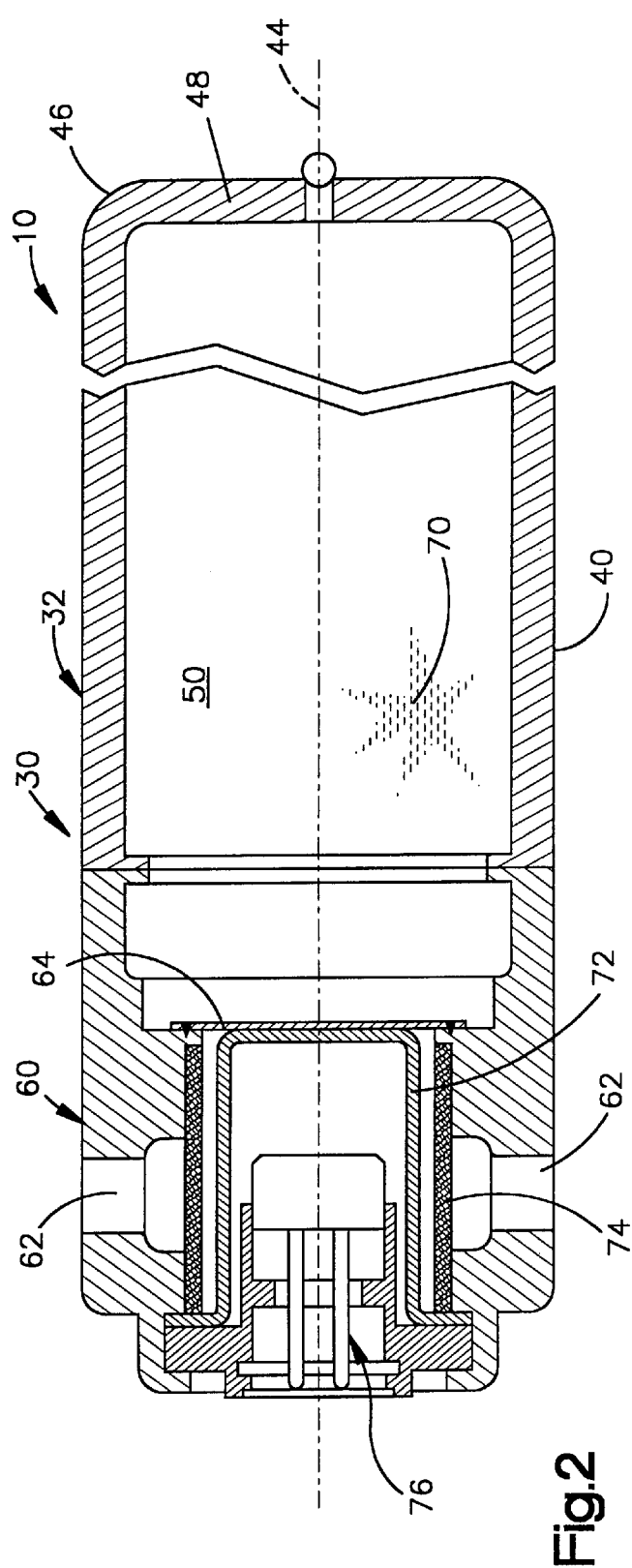
FIG. 2 is a longitudinal sectional view of the inflator of FIG. 1.

The inflator 10 includes a container or housing 30 (FIG. 2) having a main body portion 32. The main body portion 32 of the inflator housing 30 has a tubular, cylindrical configuration including a cylindrical side wall 40 centered on a longitudinal central axis 44 of the inflator 10. A first end portion 46 of the inflator 10 is closed by an end wall 48 of the inflator housing 30. The side wall 44 and the end wall 48 partially define a chamber 50 in the inflator housing 30.

The housing also includes a diffuser 60. The diffuser 60 is welded to the side wall 44 of the housing. The diffuser has a plurality of fluid outlet openings 62. The fluid outlet openings 62 are in fluid communication, through the output tube 20, with the side curtain 14. A burst disk 64 is secured to the diffuser 60 and, together with the diffuser 60, closes the chamber 50.

A quantity of inflation fluid 70, described below in detail, is contained under pressure in the chamber 50. A burst disk support cup 72 in the diffuser 60 supports the burst disk 64 against the pressure of the fluid 70 in the chamber 50. An annular filter 74 is disposed in the diffuser 60, radially outward of the burst disk support cup 72. An electrically actuatable initiator 76 is mounted in the diffuser 60 radially inward of the support cup 72.

The vehicle 18 includes known means 80 (FIG. 1) for sensing a side impact to the vehicle or a rollover condition of the vehicle and for actuating the initiator 76 in response to the sensed side impact or rollover condition. The means 80 may include a deceleration or rollover condition sensor and vehicle electric circuitry for actuating the inflator 10 in response to sensing a vehicle event for which inflation of the side curtain is desired to help protect the vehicle occupant.

Figure 5:
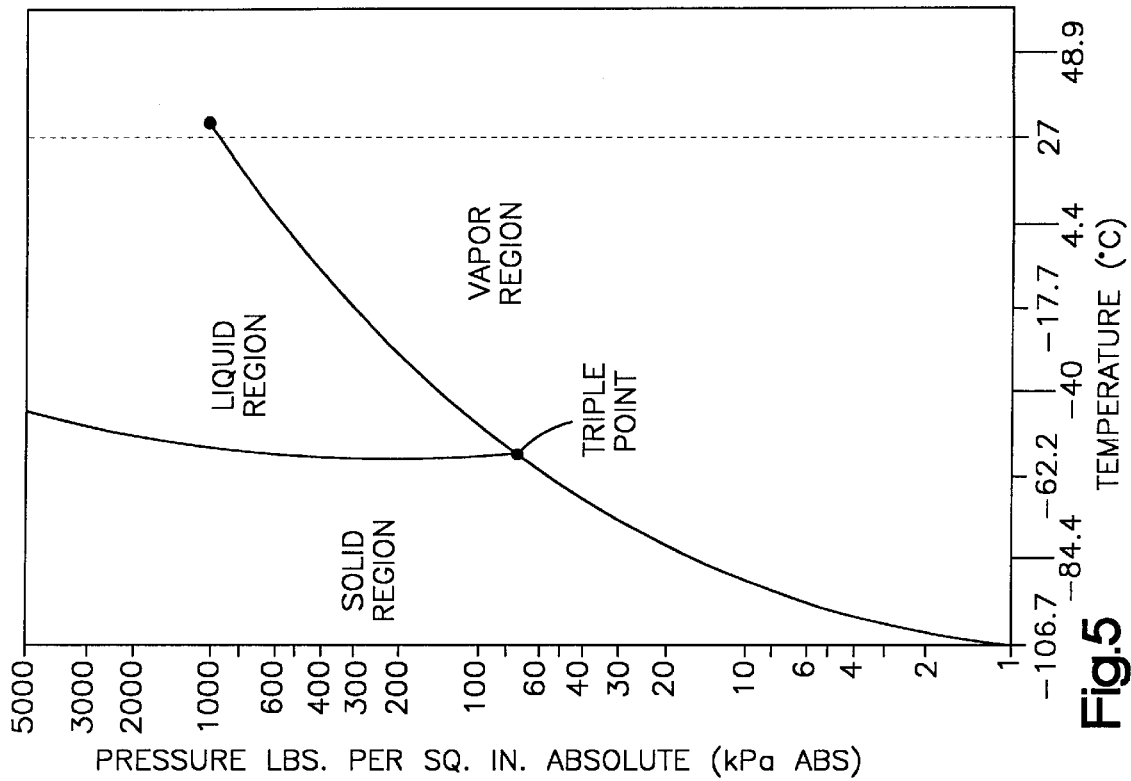
FIG. 5 is a phase diagram of carbon dioxide showing the state of the carbon dioxide at various pressure and temperatures.

The inflation fluid 70 that is contained in the chamber 50 is a mixture of a primary inflation fluid and a secondary inflation fluid. The primary inflation fluid is preferably helium in a gaseous state. The primary inflation fluid can alternatively be nitrogen, neon, argon, oxygen, hydrogen, or air. The secondary inflation fluid is preferably carbon dioxide. The secondary inflation fluid can alternatively be $CH_4$ or one of several different halocarbon refrigerant compounds. The secondary inflation fluid is in either a gaseous state or a liquid state, or portions in each, depending on the pressure and temperature in the chamber 50, as shown by the phase diagram of carbon dioxide in FIG. 5.

In response to sensing a vehicle event for which inflation of the side curtain is desired, the sensing means 80 provides an electrical signal over lead wires 82 to the inflator 10. The initiator 76 is actuated in a known manner and ruptures the burst disk support cup 72 and the burst disk 64. Inflation fluid 70 flows through the filter 74 and through the inflation fluid outlets 62 into the output tube 20. The side curtain 14 inflates fully under the pressure of the inflation fluid 70 that flows from the inflator 10.

Figure 4:
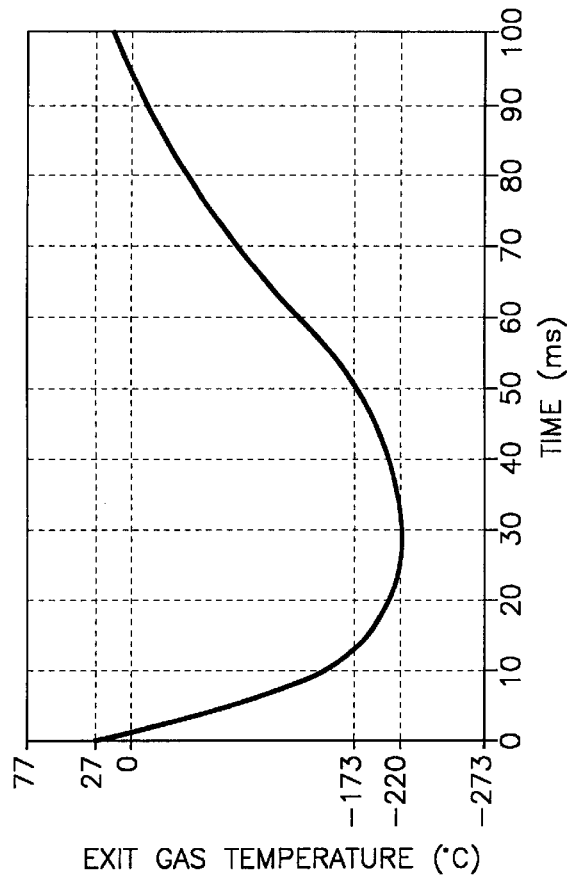
FIG. 4 is a graph which plots exit gas temperature against time for a tank test of the inflator of FIG. 2.

During the initial inflation of the side curtain 14, both the primary inflation fluid and the secondary inflation fluid, that is, both helium and carbon dioxide, flow out of the container 30 into the side curtain. As this outflow of fluid from the inflator 10 occurs, the pressure in the chamber 50 drops rapidly. Because of this pressure drop, the temperature in the chamber 50 drops rapidly. For example, the temperature in the chamber 50 can drop from ambient temperature of about 30 degrees C. to a temperature of about minus 220 degrees C. This temperature drop can occur within about 30 to 40 milliseconds after rupturing of the burst disk 64. FIG. 4 illustrates graphically the exit temperature of the fluid flowing from the chamber 50.

As a result of this very rapid temperature drop, practically all of the carbon dioxide in the chamber 50 assumes a solid or liquid state, depending on the pressure in the chamber. Any solidified carbon dioxide in the chamber 50 cannot flow out of the chamber with the initial flow of helium gas. Some liquid carbon dioxide may flow into the side curtain 14. Initial inflation of the side curtain, however, is primarily with the helium from the chamber 50. The inflator 10 preferably contains sufficient helium to inflate the side curtain 14 fully in about 30 to 40 milliseconds.

After the initial flow of helium into the side curtain, the temperature in the chamber 50 of the inflator 10 rises rapidly, because the pressure in the chamber is no longer dropping and because of the latent heat of the parts of the inflator including the housing 30. When this temperature rise occurs, any solidified carbon dioxide in the chamber 50 begins to vaporize or sublimate, that is, change from the solid state to the gaseous state, without passing through the liquid state. In addition, any liquid carbon dioxide in the chamber 50 vaporizes.

The resulting carbon dioxide gas created in the chamber 50 is directed to the side curtain 14 through the diffuser 60 and the output tube 20. Any liquid carbon dioxide in the side curtain 14 also vaporizes, because of the relatively warm temperature and relatively low pressure in the side curtain. The side curtain 14 is kept inflated by this infusion of carbon dioxide gas. The side curtain 14 is maintained inflated for a substantial period of time, for example up to about seven to ten seconds.

Figure 3:
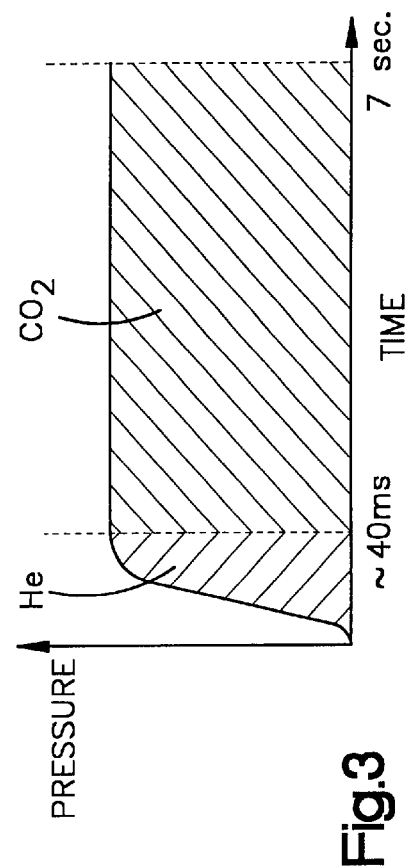
FIG. 3 is a graph which plots tank pressure against time for a tank test of the inflator of FIG. 2.

FIG. 3 illustrates in a graphical form the results of a tank test of the inflator 10, in which the output of the inflator is directed into a non-venting test tank. The curve in FIG. 3 is a graph of the tank pressure against time. The helium flows out of the inflator 10 into the tank during the first 30 to 40 milliseconds. During this time period, the pressure in the test tank rises rapidly, as indicated by the steep slope of the initial curve segment. During the subsequent time period, the gaseous carbon dioxide resulting from sublimation of solidified carbon dioxide and vaporization of liquid carbon dioxide maintains the pressure in the test tank. The pressure in the tank remains substantially the same for this extended period because the tank is closed.

If desired, a third fluid can be added to control the slope of the output curve of the inflator 10 by reducing the exit velocity of the primary inflation fluid and the secondary inflation fluid. The third fluid, preferably a gas, would have a high molecular mass. The preferred material would be argon gas. Alternative materials include dioxygen and neon or a combination of two or more of any of these gases.

From the above description of the invention, those skilled in the art will perceive improvements, changes and modifications in the invention. For example, an inflator in accordance with the present invention can also be used for inflating a driver's side air bag, a passenger side air bag, or a side impact air bag which is seat mounted or door mounted. Such improvements, changes and modifications within the skill of the art are intended to be covered by the appended claims.

Having described the invention, we claim:

1. An inflator for inflating an inflatable vehicle occupant protection device, said inflator comprising:
    a storage container;
    a primary inflation fluid stored under pressure in a gaseous state in said container;
    a secondary inflation fluid stored under pressure in said container;
    said container being openable to enable said primary inflation fluid to flow out of said container into the inflatable device to inflate the inflatable device; and
    at least a portion of said secondary inflation fluid being in a liquid state in said container during flow of said primary inflation fluid into the inflatable device, said portion of said secondary inflation fluid thereafter changing to the gaseous state and flowing into the inflatable device to maintain the inflatable device in the inflated condition.

2. An inflator as set forth in claim 1 wherein said primary inflation fluid is helium and said secondary inflation fluid is carbon dioxide.

3. An inflator as set forth in claim 1 wherein said inflator produces inflation fluid for about seven to 10 seconds.

4. An inflator as set forth in claim 1 wherein at least a portion of said secondary inflation fluid is in a liquid state in said container prior to opening of said container.

5. An inflator as set forth in claim 1 wherein at least a portion of said secondary inflation fluid flows in a liquid state from said container into the inflatable device and, thereafter, vaporizes in the inflatable device to maintain the inflatable device in the inflated condition.

6. An inflator as set forth in claim 1 wherein at least a portion of said secondary fluid solidifies in said container after opening of said container and, thereafter, vaporizes in said container and flows from said container into the inflatable device.

7. An inflator as set forth in claim 1 further including a third inflation fluid in said container for helping to control the exit velocity of inflation fluid flowing from said inflator.

8. An apparatus for inflating an inflatable vehicle occupant protection device, said apparatus comprising:
    a stored primary inflation fluid in a gaseous state;
    a conduit for directing the primary inflation fluid in the gaseous state into the inflatable device to inflate the inflatable device; and
    a stored secondary inflation fluid, at least a portion of which is in a liquid state;
    said conduit also directing the secondary inflation fluid into the inflatable device, said secondary inflation fluid vaporizing to help maintain the inflatable device in the inflated condition.

9. An apparatus as set forth in claim 8 wherein said primary inflation fluid is helium and said secondary fluid is carbon dioxide.

10. An apparatus as set forth in claim 8 wherein at least a portion of said secondary inflation fluid is in a liquid state in said container prior to opening of said container.

11. An apparatus as set forth in claim 8 wherein at least a portion of said secondary inflation fluid flows in a liquid state from said container into the inflatable device and, thereafter, vaporizes in the inflatable device to maintain the inflatable device in the inflated condition.

12. An apparatus as set forth in claim 8 wherein at least a portion of said secondary fluid solidifies in said container after opening of said container and, thereafter, vaporizes in said container and flows from said container into the inflatable device.

* * * * *